United States Patent [19]

Bean et al.

[11] Patent Number: 5,702,651
[45] Date of Patent: Dec. 30, 1997

[54] USE OF ORIENTED TABULAR AGGREGATE IN MANUFACTURE OF HIGH-FLEXURAL-STRENGTH CONCRETE

[75] Inventors: Dennis L. Bean; Philip G. Malone; Melvin C. Sykes; Judy C. Tom; Donald M. Walley, all of Vicksburg, Miss.

[73] Assignee: The United States of America as respresented by the Secretary of the Army, Washington, D.C.

[21] Appl. No.: 614,838

[22] Filed: Mar. 1, 1996

[51] Int. Cl.$^6$ .................. B28B 1/08; E04B 1/16
[52] U.S. Cl. .............. 264/34; 264/72; 264/108; 264/308; 264/DIG. 69
[58] Field of Search ............... 264/71, 108, 31, 264/34, 72, 308, DIG. 69

[56] References Cited

U.S. PATENT DOCUMENTS

| | | | |
|---|---|---|---|
| 1,600,514 | 9/1926 | Seailles et al. | 264/71 X |
| 2,175,715 | 10/1939 | Denning | 264/108 X |
| 2,890,492 | 6/1959 | Smith | 264/108 X |
| 3,227,785 | 1/1966 | Masreliez | 264/71 |
| 3,458,610 | 7/1969 | Sainty | 264/71 X |
| 3,770,859 | 11/1973 | Bevan | 264/108 X |
| 3,917,781 | 11/1975 | Gabriel et al. | 264/71 |
| 3,959,422 | 5/1976 | Wilhelm | 264/71 X |
| 4,062,913 | 12/1977 | Miller et al. | 264/108 X |
| 4,275,110 | 6/1981 | Margerie | 264/71 X |
| 4,339,405 | 7/1982 | Paszner | 264/108 |
| 4,522,772 | 6/1985 | Bevan | 264/71 |
| 4,935,178 | 6/1990 | Esposito et al. | 264/71 X |
| 5,173,233 | 12/1992 | Kafarowski | 264/71 X |

FOREIGN PATENT DOCUMENTS

| | | | |
|---|---|---|---|
| 49-32305 | 8/1974 | Japan | 264/108 |
| 814762 | 4/1981 | U.S.S.R. | 264/108 |
| 142487 | 10/1921 | United Kingdom | 264/108 |
| 1326006 | 8/1973 | United Kingdom | 264/245 |
| 2108897 | 5/1983 | United Kingdom | 264/108 |
| 2130627 | 6/1984 | United Kingdom | 264/108 |

OTHER PUBLICATIONS

Kosmatka, S.H., and Panarese, W.C., "Design and Control of Concrete Mixtures," 13th edition, Portland Cement Association, Skokie, IL, 1990.

*Primary Examiner*—Karen Aftergut
*Attorney, Agent, or Firm*—Luther A. Marsh

[57] ABSTRACT

High-flexural-strength concrete is produced by mixing wet hydraulic cement-sand mixture with coarse, flat, tabular aggregate, pouring the resulting mixture into a form in a shallow layer, vibrating the form containing the mixture, thereby orienting the coarse aggregate particles, pouring another shallow layer of the mixture into the form, again vibrating the form, and repeating these processes until the form has been filled to the desired level. The mixture then is allowed to cure. Cast-in-place items are prepared by placing thin layers or lifts of oriented, tabular-aggregate concrete into conventional forms and vibrating each lift using flat-plate vibrators.

5 Claims, No Drawings

USE OF ORIENTED TABULAR AGGREGATE IN MANUFACTURE OF HIGH-FLEXURAL-STRENGTH CONCRETE

GOVERNMENT INTEREST STATEMENT

The invention described herein may be manufactured, licensed, and used by or for governmental purposes without the payment of any royalties thereon.

BACKGROUND OF THE INVENTION

1. Field of Invention

This invention relates to a method of producing concrete having improved flexural strength. More specifically, it relates to a method of producing high-flexural-strength concrete by incorporating in the concrete, oriented, flat, tabular aggregate.

2. Prior Art

Standards for aggregate used in concrete call for the use of no more than 10–15% by weight of flat or elongated aggregate particles (Kosmatka, S. H., and Panarese, W. C., "Design and Control of Concrete Mixtures," 13th edition, Portland Cement Association, Skokie, Ill., 1990). Flat aggregate particles are described as adversely affecting the durability of concrete due to the formation of water or air voids under the aggregate particles. The U.S. Army Corps of Engineers recommends that in mass concrete the amount of flat or elongated particles be limited to 25% of any size group of coarse aggregate (U.S. Army Corps of Engineers, 1994. Standard Practice for Concrete for Civil Works Structures EM 1110-2-2000, page 210, paragraph 2-3b(6)g). Excessive amounts of flat particles affect the water demand and finishability.

In current practice, no attempt is made to orient the particles of aggregate when a fresh concrete mixture is being placed inside a form. No attempt is made to proportion a concrete mixture to be highly fluid in order to allow aggregate particles to be aligned.

SUMMARY OF THE INVENTION

It has now been determined that, contrary to conventional standards, flat, tabular aggregate may be incorporated in concrete by the method of this invention and that the tabular particles can be made to assume a specific orientation during the placement of the fresh concrete mixture. Furthermore, the concrete mixture can be formulated with cement, fine aggregate, and admixtures that will facilitate the orientation and provide a consistent bond to the oriented tabular aggregate. The resulting concrete, after curing has increased flexural strength, decreased tendency to crack, and decreased permeability to water. In accordance with the method of this invention, the particles of coarse, flat, tabular aggregate used have a length and width ranging from about 25 to about 150 mm, and a thickness ranging from about 3 to about 15 mm.

DETAILED DESCRIPTION OF THE INVENTION

In a preferred embodiment of this invention, flat, tabular aggregate, hereinafter referred to as coarse aggregate, such as slate, tabular limestone, tabular mollusk shells, or scrap tile, is screened to remove particles whose largest dimension (length or width) is less than about 25 mm. Particle thicknesses range from about 3 to about 15 mm. This coarse aggregate is cleaned to remove dust on the surface and is blended into a mixture containing clean water, a hydraulic cement, a fine aggregate, and mineral and chemical admixtures, in a concrete mixer.

The fine aggregate is natural or crushed sand. Mineral admixtures such as silica fume are added to improve the adherence of the cement to the aggregate. Chemical admixtures known to increase the fluidity of the mixture without requiring increased water content are also added to allow the cement-sand paste to flow around the coarse aggregate so that the entrapment of air bubbles during placement is minimized. Additional chemical admixtures that increase the time-to-set in the concrete may also be employed when the time required for the placement of the concrete exceeds the normal set time.

The aggregate is blended into the wet hydraulic cement-sand mixture in a concrete mixer and mixed until all the coarse aggregate is coated with the cement-sand paste. Increases of flexural strength have been noted with the addition of as little as 18% by weight of flat, oriented, tabular, slate aggregate incorporated in the mixture. Experiments with slate aggregate indicate that up to 48% by weight of coarse slate aggregate can be added before voids appeared in the finished concrete. The hydraulic cement used can be any cement with low viscosity and long time to initial set. All of the portland cements listed in ASTM Specification C 150, Specification for Portland Cement, can be used in manufacturing concrete with oriented, tabular aggregate. Experimental work done with slate aggregate has used ASTM types I and II portland cement. A typical mixture used to make one cubic yard of concrete with oriented, tabular aggregate is as follows:

| | |
|---|---|
| Cement, ASTM C 150, Type I-II Portland Cement | 846.0 lb |
| Coarse aggregate (slate) | 1,230.0 lb |
| Fine aggregate (sand) | 1,688.0 lb |
| Water | 338.4 lb |
| High-range water reducer (ASTM C 494 Type A) | 410 oz. |

The concrete mixer is tilted and the mixture poured into a form, forming a shallow layer of about 25 mm in depth. The form is vibrated to consolidate the mixture and to release air bubbles trapped under pieces of coarse aggregate. The coarse aggregate particles tend to orient themselves with their broadest surface parallel to the plane of the bottom of the form. A second layer of the mixture is then poured into the mold also having a depth of about 25 mm, and the form is vibrated again to release air bubbles and to orient the coarse aggregate particles. These processes are repeated until the form has been filled with concrete mixture to the desired depth. The mixture is allowed to cure in the form. After 28 days, the flexural strength of the concrete, as expressed by its modulus of rupture, as measured by ASTM C 78-84, and its unconfined compressive strength, by ASTM C 109-92, are determined.

For conventional portland cement concrete, it has been found empirically that the flexural strength, or modulus of rupture, is 7.5–10 times the square root of the unconfined compressive strength expressed in pounds per square inch (psi) (Komatka et al., 1990.) Concrete prepared in accordance with the method of the present invention has a modulus of rupture 20–125% higher than the modulus of rupture predicted by the above empirical rule for conventional portland cement concrete. Typical flexural strength measurements are given in Table 1.

TABLE 1

Flexural Strength of Portland Cement Concrete Prepared with Flat, Tabular, Coarse Aggregate After Moist-Curing for 28 Days

| Sample Series | 940065 | 940066 | 940071 | 940038 |
|---|---|---|---|---|
| Coarse Aggregate Content, % |  | 18.6 | 40.17 | 47.047.97 |
| Modulus of Rupture, psi | 1,010 | 1,550 | 1,440 | 1,380 |
| Unconfined Compressive Strength, psi | 6,580 | 11,840 | 14,300 | 6,720 |
| Predicted Modulus | 608–811 | 803–1,071 | 897–1,195 | 614–820 |
| Increase Over Predicted Modulus of Rupture, % | 20–68 | 45–93 | 20–60 | 68–125 |

It is clearly apparent from the above table that concrete prepared in accordance with the method of this invention has a significantly increased modulus of rupture compared with conventional concrete.

Concrete prepared with coarse, oriented, tabular aggregate may be used in the manufacture of precast items such as paving blocks and structural beams, or may be used in cast-in-place applications such as concrete paving, foundation slabs, or secondary containment structures for chemical or fuel tanks or containers. Fabrication of precast items may precede using conventional molding techniques or may involve fabricating a larger concrete mass in accordance with the method of this invention and cutting a beam or slab out of the larger piece. Manufacturing items by trimming them from a larger mass eliminates any edge effects that the sides of the mold have on the distribution of the aggregate, and makes it possible to reliably make items such as narrow test beams from concrete containing large pieces of aggregate that would not fit well in a small mold.

Cast-in-place items such as roadway or runway sections are manufactured by placing thin layers or lifts of oriented, tabular-aggregate concrete into conventional formwork and vibrating each lift using flat-plate vibrators moved across the top of the lift.

Oriented, tabular-aggregate concrete can be finished by allowing the sand-cement paste in the concrete mixture to form a smooth surface that can be screed and troweled to form a flat surface or a flat surface can be formed by allowing the concrete to cure and grinding the surface flat.

Curing procedures used with oriented tabular-aggregate concrete follow normal practice with portland cement. The coarse tabular aggregate may be slate, tabular limestone, mollusk shells, or scrap tile.

While this invention has been described in terms of a specific preferred embodiment, it is understood that it is capable of further modification and adaptation of the invention following in general the principle of the invention and including such departures from the present disclosure as come within the known or customary practice in the art to which the invention pertains and as may be applied to the central features set forth, and fall within the scope of the invention and of the limits of the appended claims.

What is claimed is:

1. A method of producing high-flexural-strength concrete comprising the steps of
   (a) mixing coarse aggregate particles consisting of flat, tabular particles in a mixer with a wet hydraulic cement-sand mixture so as to coat the coarse aggregate particles with the cement-sand mixture and thus form a mixture of the coarse aggregate particles and the cement-sand mixture comprising from about 18% to about 48% by weight of the coarse aggregate particles;
   (b) pouring the mixture of the coarse aggregate particles and the cement-sand mixture into a form, producing a first shallow layer;
   (c) vibrating the form containing the mixture poured in step (b), thereby releasing air bubbles and orienting the coarse aggregate particles in the first shallow layer;
   (d) pouring a second shallow layer of the mixture of the coarse aggregate particles and the cement-sand mixture into the form;
   (e) again vibrating the form as in step (c);
   (f) repeating the pouring and vibrating processes until the form is filled with the mixture of the coarse aggregate particles and the cement-sand mixture; and
   (g) allowing the mixture of the coarse aggregate particles and the cement-sand mixture to cure into the high-flexural-strength concrete.

2. A method of producing cast-in-place high-flexural strength concrete comprising the steps of
   (a) mixing coarse aggregate particles consisting of flat, tubular particles in a mixer with a wet hydraulic cement-sand mixture so as to coat the particles with the cement-sand mixture and thus form a mixture of the particles and the cement-sand mixture comprising from about 18% to about 48% by weight of the coarse aggregate particles;
   (b) pouring the mixture resulting from step (a) into a lift producing a first shallow layer;
   (c) vibrating the lift containing the poured mixture, thereby releasing air bubbles and orienting the coarse aggregate particles in the first shallow layer;
   (d) pouring the vibrated mixture from the lift into a stationary form;
   (e) repeating steps (b), (c), and (d) until the form is filled; and
   (f) allowing the mixture poured into the form to cure into the cast-in-place high flexural strength concrete.

3. The methods of claims 1 or 2 wherein the coarse aggregate particles consist of flat, tabular particles having a length and width ranging from about 25 to about 150 mm, and a thickness ranging from about 3 to about 15 mm.

4. The method of claim 3 wherein the flat, tabular particles are selected from the group consisting of slate, limestone, mollusk shells, scrap tile, and mixtures thereof.

5. The methods of claims 1 or 2 wherein a depth of the shallow layers is about 25 mm.

* * * * *